United States Patent
Storey

[19]

[11] Patent Number: 5,890,627
[45] Date of Patent: Apr. 6, 1999

[54] APPARATUS, ADAPTABLE TO SALES CONTAINERS, FOR VOLUMETRIC DISPENSING OF POWERED MATERIALS

[76] Inventor: David W. Storey, 101 Bayou La., Breaux Bridge, La. 70517

[21] Appl. No.: 906,293

[22] Filed: Aug. 5, 1997

[51] Int. Cl.⁶ .................................................. A47G 19/12
[52] U.S. Cl. .................... 222/129; 222/142.6; 222/142.9
[58] Field of Search .................................... 222/129–132, 222/144.5, 142.6, 142.9, 461

[56] References Cited

U.S. PATENT DOCUMENTS

| | | | |
|---|---|---|---|
| 1,208,189 | 12/1916 | Miller | 222/142.9 |
| 1,750,258 | 3/1930 | Brown . | |
| 1,896,827 | 2/1933 | Neely . | |
| 2,102,978 | 12/1937 | Slining . | |
| 2,469,034 | 5/1949 | Garris | 222/142.9 |
| 2,800,257 | 7/1957 | Nixon . | |
| 2,880,915 | 4/1959 | Kantor . | |
| 2,887,254 | 5/1959 | Menderman . | |
| 3,831,743 | 8/1974 | Leedy | 206/338 |
| 4,261,468 | 4/1981 | Krebs | 206/538 |
| 4,961,521 | 10/1990 | Eckman | 222/142.5 |
| 5,487,494 | 1/1996 | Robbins, III | 222/158 |
| 5,601,213 | 2/1997 | Daniello | 222/456 |
| 5,758,786 | 6/1998 | John | 215/5 |

Primary Examiner—Andres Kashnikow
Assistant Examiner—David Deal
Attorney, Agent, or Firm—Jesse D. Lambert

[57] ABSTRACT

Apparatus, adapted for use with commercial sales containers containing dry powdered or granular materials, for metered dispensing of portions of the container volume, while sealing the container between uses. A divider comprising multiple vanes is inserted into a container. The vanes run generally vertically and contact the bottom and inner wall of the container when in place, forming a plurality of compartments within the container. The upper edges of the vanes are substantially even with the top edge of the container. The divider is made of flexible, washable material. A lid having a circumferential distensible lip snaps atop the container, the lower surface of the lid contacting the upper edges of the vanes. The lid may be rotated while in place atop the container, and has an opening which may be aligned over one of the compartments formed by the divider. A generally funnel-shaped top attaches to the lid, with a sealing cap permitting sealed storage of the container between servings. By rotating the lid and funnel top assembly to align the opening over one of the compartments, the contents of the compartment may be poured out while retaining the powdered materials in the remaining compartments in the container. In one embodiment, the apparatus is especially adapted for use with commercial sales containers of powdered infant food ("baby formula").

8 Claims, 4 Drawing Sheets

FIG. 1
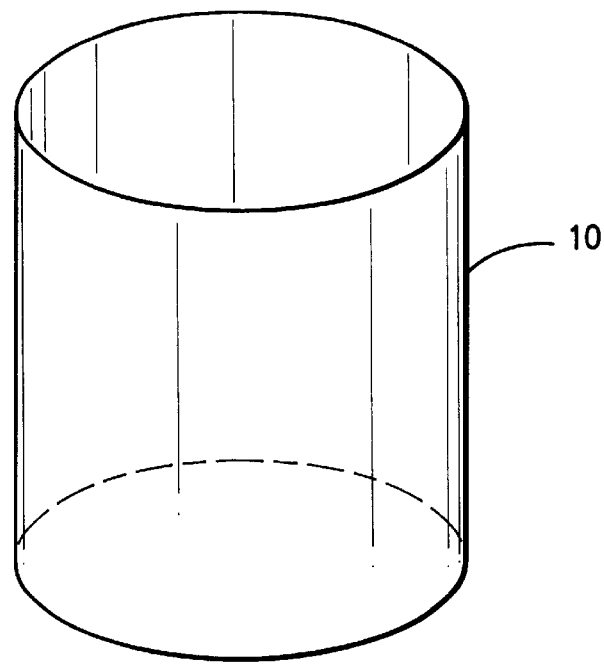
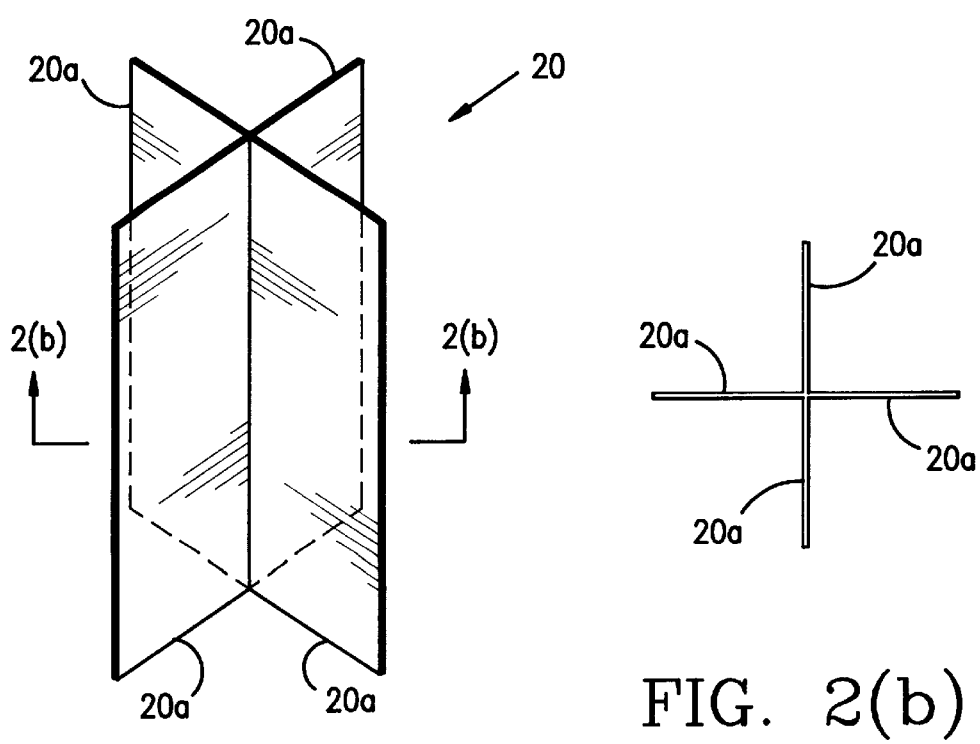
FIG. 2(a)
FIG. 2(b)

APPARATUS, ADAPTABLE TO SALES CONTAINERS, FOR VOLUMETRIC DISPENSING OF POWERED MATERIALS

BACKGROUND—FIELD OF THE INVENTION

This invention relates to apparatus used to provide controlled volumetric dispensing of dry, powdered or granular materials from containers. With further specificity, this invention relates to apparatus, adaptable to use in conjunction with the containers in which such materials are often sold, which partition such containers into a desired number of compartments, and permit dispensing of the powdered or granular materials from only a single compartment at one time.

BACKGROUND—DESCRIPTION OF RELATED ART

Many types of dry, powdered or granular materials, in particular foodstuffs such as cereals, granular foods such as rice, and powdered foods such as infant formula, are packaged for sale in bulk, multi-serving containers, from which the desired portion is removed as needed. Often, the desired portion is removed by scooping from the larger container; alternatively, a portion may be poured from the container. Control over the volume dispensed must be done by pouring into a known volume container, such as a measuring cup.

While reference will be made herein to "powdered material", it is understood that such term includes flowable materials such as cereals and granular goods as well as powdered foodstuffs and non-foodstuffs.

However, such manner of dispensing a desired volume of the powdered material is inconvenient. One application in which additional ease of known volumetric dispensing is desired is in infant food, commonly called "baby formula". Although baby formula is available in liquid, pre-mixed form, due to economy and ease of storage many people purchase such formula as a dry powder, to which water or milk is added.

Powdered baby formula is often packaged for sale in upright cylindrical containers, typically of reinforced paper (a "sales container"). The sales container has an open top which is covered with a seal (typically a paper or foil piece, adhesively attached to the top edge of the container). An airtight, removable lid is provided which typically has a circumferential, distensible lip which "snaps" onto the top of the container. To open the container, the removable lid is taken off and the seal is removed. From that point forward, the removable airtight lid may be removed and replaced at will, keeping the contents of the sales container dry between servings. Each container of powdered baby formula has sufficient powdered formula for several feedings of liquid formula. It is desirable, then, to have a way to partition the total sales container volume into several compartments, and be able to simply pour out the contents of one compartment into another container for mixing, while keeping the contents of the other compartments in place and dry.

The related art shows no apparatus, adapted to be used in conjunction with a standard sales container, and reusable in another sales container when one sales container is completely consumed, to achieve this objective. Several related art patents exist for dispensing of powdered materials, all of which share the characteristic of being attached to or incorporated into the top of a container, forming a chamber into which the material is poured. Then, the chamber is sealed off from the container, and the goods are poured from the chamber into the ultimate use container. Examples of such devices include U.S. Pat. Nos. 2,102,978 to Slining (Dec. 21, 1937); 2,800,257 to Nixon (Jul. 23, 1957); 2,880,915 to Kantor (Apr. 7, 1959); 2,887,254 to Menderman (May 19, 1959); 4,961,521 to Eckman (Oct. 9, 1990); 5,487,494 to Robbins, III; 5,601,213 to Daniello (Feb. 11, 1997). These apparatus all contain a multitude of parts making manufacture difficult, and are not adapted for use in conjunction with sales containers by forming compartments therein.

Other patents disclose containers with generally vertically placed pieces dividing the main compartment; however, all such patents disclose particular, specially configured containers, not for use in conjunction with the containers in which the goods may be sold. For example, U.S. Pat. No. 1,750,258 to Brown (Mar. 11, 1930), in one embodiment, shows a specially constructed cylinder with partitions therein. The apparatus is "special built", that is to say, is not adapted to be used in conjunction with a sales container, but rather the powdered materials are poured into the special built container (with the partitions already in place) from a bulk container.

Other examples of compartmentalized containers are U.S. Pat. Nos. 1,896,827 to Neely (Feb. 7, 1933); 3,831,743 to Leedy (Aug. 27, 1974); and 4,261,468 to Krebs (Apr. 14, 1981). All of these are containers having integral or effectively non-removable inner partitions, and are designed for small holding small objects such as buttons, nails, pills, and the like.

None of the related art patents disclose the present invention. None of the related art patents disclose an apparatus which comprises:

- a container of the type typically used to package powdered materials for sale (a "sales container");
- a divider having multiple vanes adapted to be removably inserted vertically into a sales container, with the sales container being at least partially full of the powdered material, the vane members upon insertion forming a multitude of compartments within the sales container;
- a removable lid which sealingly attaches to the open top of the sales container, the lid having an opening with an appropriate size and shape to permit pouring the powdered material from one of the compartments thus created; and
- a funnel top fitted over the lid to facilitate pouring of the powdered material from the sales container, the funnel top having a removable cap to permit sealed storage of the container.

Objects and Advantages

It is therefore an object of the present invention to provide an apparatus which is adapted to be used with sales containers of powdered materials to permit dispensing of only a desired, measured amount of the powdered material at a time. It is a further object of the present invention to seal the sales container when not dispensing. It is yet another object to provide an apparatus which is made of durable material, that may be washed (by hand or machine) between uses, and which will last for multiple uses. Another object is to provide a means adaptable to insertion into a substantially full container of powdered materials. Other objects include providing a device which is easy to use and inexpensive to manufacture. Yet other objects and advantages of the invention will become apparent from a consideration of the ensuing description and drawings.

REFERENCE NUMERALS IN DRAWINGS

| 10  | Container | 30a | Opening    |
|-----|-----------|-----|------------|
| 20  | Divider   | 30b | Lip        |
| 20a | Vanes     | 40  | Funnel top |
| 30  | Lid       | 40a | Cap        |

DRAWINGS FIGURES

FIG. 1 is a schematic of a sales container for powdered materials.

FIG. 2 is a schematic of the divider of the present invention.

DESCRIPTION OF THE PREFERRED EMBODIMENTS

Although there may be various embodiments of the present invention, with reference to FIGS. 1 through 7 one embodiment is described.

FIG. 1 shows a typical container 10 for powdered materials. Such containers, or "sale containers", are typically of an upright cylindrical shape, and made be made of reinforced, coated paper, or plastic. Although reference is made herein to such containers used for sale of powdered infant food, or "baby formula", it is understood that the present invention may be applied to any type of dry, flowable powdered or granular goods, including foods such as coffee, grains, spices and the like, and to non-foodstuff household products such as washing powder.

FIG. 2 shows a divider 20 of the present invention. Divider 20 is typically of relatively stiff but flexible, thin, material such as plastic, which may be repeatedly inserted into and removed from container 10, as will be hereinafter described, and which may be repeatedly hand or machine washed between uses for cleanliness. Additionally, plastics provide a divider that will deform slightly to accommodate slightly differing interior dimensions of container 10. Other materials well known in the art may also be used for the divider. Vanes 20a radiate outward from a central axis of divider 20. Although divider 20 is shown here having four vanes 20a thus forming four compartments within container 10 upon insertion therein, it is understood that a greater or lesser number of compartments could be formed with divider configurations having a different number of vanes.

Figure 3:
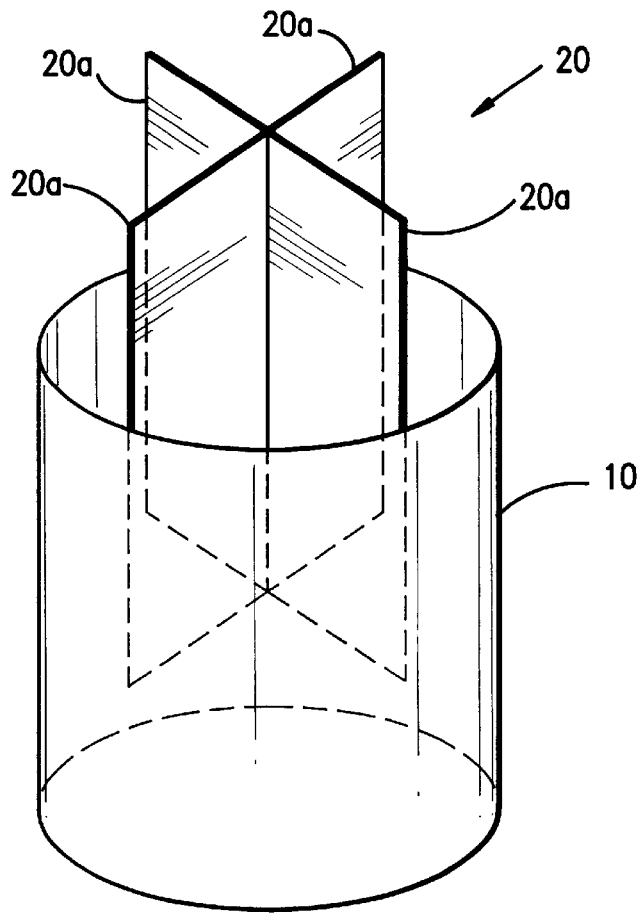
FIGS. 3 and 4 show the divider of the present invention partially inserted into a sales container and a top view of the sales container with the divider installed.
Figure 4:
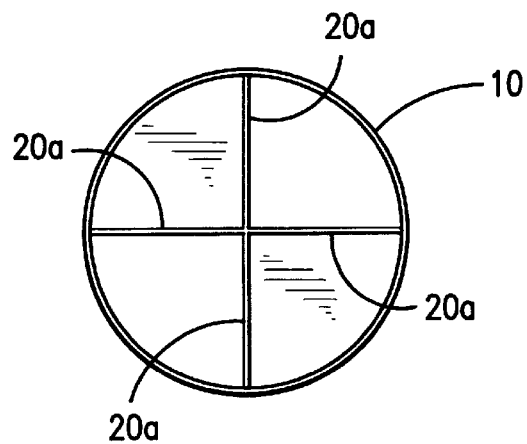
Figure 7:
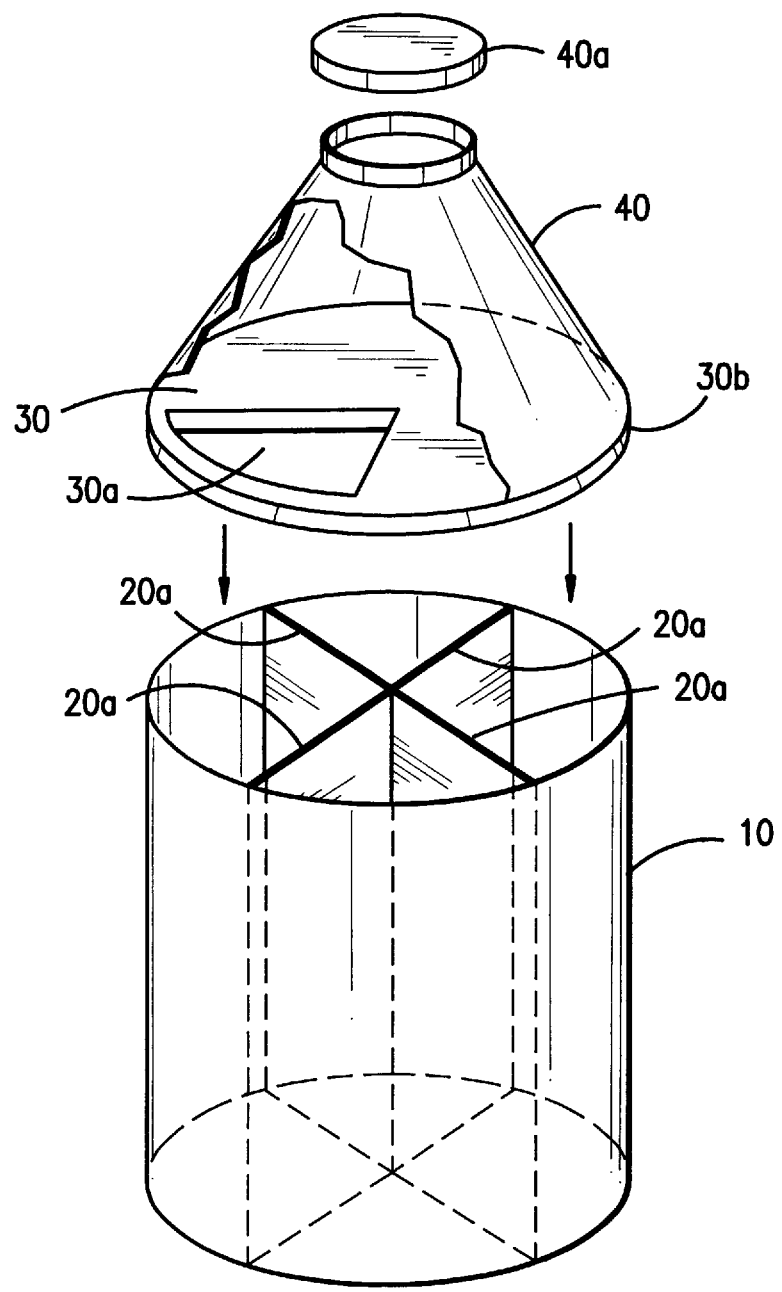
FIG. 7 is a view of the lid and funnel top, in position for placement atop a sales container having the divider therein.

In use, divider 20 is placed within container 10 after container 10 is opened, as shown in FIG. 3. Typically, during the packaging process, container 10 has a seal covering the upper end. When the seal (which is typically a thin sheet of paper or foil held about the top rim of container 10 by an adhesive) is removed, the full area of container 10 is exposed. The powdered materials then occupy most of the volume of container 10. Divider 20 is inserted down into container 10, through the powdered materials contained therein. FIG. 3 shows divider 20 partially inserted into container 10. FIG. 4 is a top view of divider 20 in place in container 10. The height of divider 20 is such as to extend from the bottom surface of container 10 to substantially the top edge of container 10, as will be later described and as shown in FIG. 7. The width of vanes 20a is such that vanes 20a contact the inner wall of container 10. In addition to positively forming the compartments, such contact prevents movement (particularly rotation) of divider 20 within container 10 after the lid 30 is installed. Upon placement of divider 20 fully to the bottom surface of container 10, a number of compartments, each having equal volumes of the powdered materials therein, are formed.

Figure 5A:
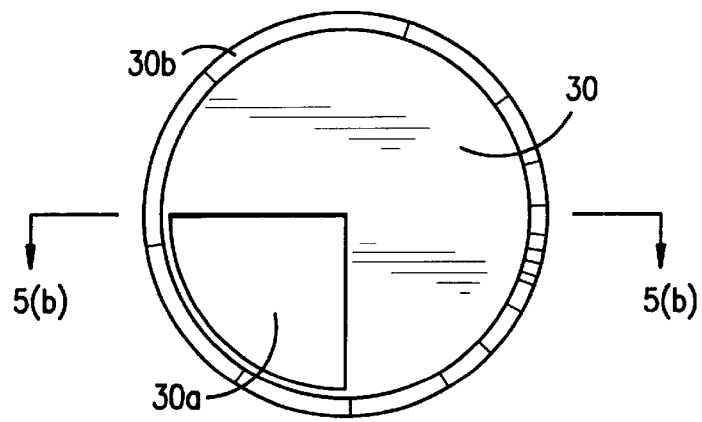
FIG. 5 shows top and side views of the lid.
Figure 5B:

With divider 20 fully seated in container 10, lid 30 is placed over the open upper end of container 10. In the preferred embodiment, as shown in FIG. 5, lid 30 has a circumferential, distensible outer lip 30b which "snaps" over the top rim of container 10. Lid 30 has an opening 30a which, in the preferred embodiment, substantially conforms to the size and shape of the cross section of each compartment formed in container 10 by divider 20. Such size and shape of opening 30a yields maximum flow area. It is understood, however, that opening 30a could take different shapes, such as circular, rectangular, or other shapes, as long as the dimensions of opening 30a do not permit flow of the powdered materials from more than one compartment at a time, when opening 30a is centrally aligned over one compartment. Although in the preferred embodiment lid 30 has lip 30b for installation by "snapping over" a top lip of container 10, it is understood that other attachment means, providing a suitable friction fit, could be used. Lid 30 may be of flexible plastic or other suitable material well known in the art.

Figure 6:
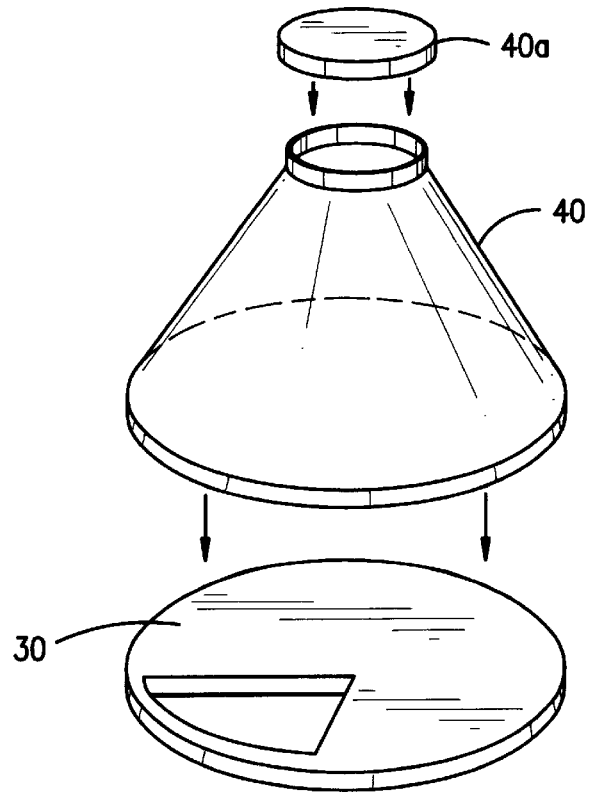
FIG. 6 shows the funnel top and cap in combination with the lid.

In the preferred embodiment, funnel top 40 is attached to lid 30 as shown in FIG. 6. Funnel top 40 permits the powdered materials to be readily poured from container 10 into another container, typically a mixing container of some sort. While a particular funnel shape is depicted in the drawings, it is understood that other shapes are equally possible. Cap 40a sealingly attaches over the open end of funnel top 40 to seal container 10 between servings.

To use the apparatus, divider 20 is inserted into container 10, with container 10 at least partially full of dry goods as described above and as shown in FIGS. 3 and 4. Vanes 20a contact the bottom surface and the inner wall of container 10 as shown in FIG. 7. The assembly comprising lid 30 and funnel top 40 is then attached over the open upper end of container 10 by snapping lip 30b of lid 30 over the upper edge of container 10. When in place, the lower surface of lid 30 is in sealing contact with the upper edges of vanes 20a. Thus, equal volume compartments are formed within container 10 by the lower edges of vanes 20a in sealing contact with the bottom surface of container 10; the upper edges of vanes 20a in sealing contact with the lower surface of lid 30; and the outer edges of vanes 20a in sealing contact with the inner wall of container 10. Lid 30 and funnel top 40 may be rotated to align opening 30a over one of the compartments thus formed. The contents of the powdered materials within that compartment may be readily poured out of container 10, while retaining the contents of the remaining compartments in place. After the desired quantity of powdered materials is poured out, cap 40a may be placed atop funnel top 40 to seal off the contents until next usage. In like manner, each compartment may be dispensed in turn. After all compartments within container 10 are emptied, lid 30 and funnel top 40 are removed, and divider 20 may then be removed for washing (if desired) and reuse in another sales container.

Summary and Scope

As above described, the apparatus of the present invention provides an easy and convenient means for dispensing only a desired amount of powdered materials from a container, while permitting the container to be sealed while not dispensing. The apparatus is adapted to use on the sales containers in which such powdered materials are commonly packaged, avoiding transfer of the powdered materials from the sales container to another, specially constructed container, with the attendant problems in handling and additional expense. Inexpensive and readily available materials, such as plastics, make the apparatus amenable to inexpensive production.

Although the description above contains many specificities, these should not be construed as limiting the scope of the invention but as merely providing illustrations of some of the presently preferred embodiments of this invention. For example, the apparatus is equally suitable for use on cylindrical containers containing any dry, flowable goods, such as grains or cereals, or non-food items such as washing powder. Funnel top 40 may be of different configurations as desired to provide ease of pouring the powdered materials from container 10 to the ultimate serving container. Any desired number of compartments may be defined inside container 10 by varying the number of vanes making up divider 20, so that different portion volumes may be readily dispensed.

Thus the scope of the invention should be determined by the appended claims and their legal equivalents, rather than by the examples given herein.

I claim:

1. An apparatus for volumetric dispensing of flowable materials, comprising:
   a) a cylindrical container having a closed bottom end and an open top end, an interior of said cylindrical container being substantially circular in cross section and substantially free of projections;
   b) a removable divider inserted into said container, said divider comprising multiple, substantially vertically disposed vanes radiating outward from the longitudinal axis of said container, each of said vanes comprising lower, upper, and outer edges, said lower edges of said vanes contacting a bottom surface of said container, said upper edges of said vanes substantially even with an upper edge of said container, and said outer edges of said vanes contacting and sealing against an inner wall of said container, said divider removably held within said container by friction contact between said outer edges of said vanes and said inner wall of said container; and
   c) a lid having an opening therein, said lid removably attached to said container and covering said open top of said container, said lid comprising a circumferential distensible outer lip adapted to snap tightly over an upper lip of said container.

2. The apparatus of claim 1, further comprising a funnel-shaped top attached to and covering said lid.

3. The apparatus of claim 2, wherein said divider and said lid are flexible plastic.

4. An apparatus for volumetric dispensing of powdered baby formula, comprising:
   a) a cylindrical container having at least some powdered baby formula therein, said container having a closed bottom end and an open top end;
   b) a divider inserted into said container while having at least some baby formula therein, said divider comprising multiple generally vertically disposed vanes, each of said vanes contacting a bottom surface and an inner wall of said container, said vanes spanning substantially the entire height of said container, said vanes thus forming a plurality of compartments within said container; and
   c) a lid fitted over said open top end of said container, said lid having a circumferential distensible outer lip which snaps over a top edge of said container, said lid having an opening therein for alignment with one of said compartments by rotation of said lid, a lower surface of said lid sealingly contacting an upper edge of each of said vanes.

5. The apparatus of claim 4, further comprising a funnel top attached over said lid.

6. The apparatus of claim 5, wherein said divider, said lid, and said funnel top are plastic.

7. The apparatus of claim 5, further comprising a removable cap covering an outlet of said funnel top.

8. A method for volumetric dispensing of flowable materials, comprising the steps of:
   a) inserting a divider having multiple outwardly radiating vanes into a cylindrical container having at least some flowable material therein, thus forming a plurality of compartments within said container;
   b) fitting a lid having an opening therein over an open top of said cylindrical container, said lid frictionally and rotatably attached to said container;
   c) rotating said lid to align said opening over one of said compartments; and
   pouring a volume of said flowable material, corresponding to a volume of one of said compartments, from said container.

\* \* \* \* \*